(12) United States Patent (10) Patent No.: US 11,904,292 B2
Flaugher et al. (45) Date of Patent: *Feb. 20, 2024

(54) ADSORBENT SYSTEM

(71) Applicant: Flow Dry Technology, Inc., Brookville, OH (US)

(72) Inventors: David V. Flaugher, Beavercreek, OH (US); Jason K. Ward, Oakwood, OH (US); Charles E. Dinkler, II, Oakwood, OH (US)

(73) Assignee: FLOW DRY TECHNOLOGY, INC., Brookville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,469

(22) Filed: Nov. 23, 2022

(65) Prior Publication Data

US 2023/0091907 A1 Mar. 23, 2023

Related U.S. Application Data

(63) Continuation of application No. 16/103,431, filed on Aug. 14, 2018, now Pat. No. 11,541,371.

(Continued)

(51) Int. Cl.
*B01D 53/02* (2006.01)
*B01J 20/10* (2006.01)
(Continued)

(52) U.S. Cl.
CPC .............. *B01J 20/103* (2013.01); *B01J 4/008* (2013.01); *B01J 20/08* (2013.01); *B01J 20/18* (2013.01);
(Continued)

(58) Field of Classification Search
CPC ........ B01D 2253/104; B01D 2253/106; B01D 2253/108; B01D 2253/308;
(Continued)

(56) References Cited

U.S. PATENT DOCUMENTS 3,572,008 A * 3/1971 Hankison .............. F22B 37/265
 95/122
4,731,709 A 3/1988 Freudenreich et al.
(Continued)

FOREIGN PATENT DOCUMENTS

CN 102917767 A 2/2013
CN 204497595 U 7/2015
(Continued)

OTHER PUBLICATIONS

OhE Chemicals Inc., Silica Gel Instructions, 4 pages. Apr. 2010. Retrieved on Dec. 11, 2018: http://www.ohe-chem.co.jp/E0071b.pdf.
(Continued)

*Primary Examiner* — Christopher P Jones
(74) *Attorney, Agent, or Firm* — Thompson Hine LLP

(57) ABSTRACT

An adsorbent system including an enclosure having a cavity defining a humidity-controlled environment and a body having or defining a channel therein. The body is coupled to the enclosure such that a first end of the channel is in selective fluid communication with an ambient environment and a second end of the channel is in fluid communication with the humidity-controlled environment. The system further includes an adsorbent material in the channel, wherein the channel and adsorbent material are configured such that inlet fluid flowing from the first end to the second end through the channel is flowable over at least a portion of the adsorbent material, and such that outlet fluid flowing from the second end to the first end is directly flowable over a majority of the portion of the adsorbent material that is flowable over by the inlet fluid, The system further includes a valve system positioned at or adjacent to or in fluid communication with the first end of the channel. The valve system includes an inlet valve portion that is biased to a closed position to generally block a flow of inlet fluid (Continued)

therethrough and that is movable to an open position when a pressure in the channel is sufficiently low relative to a pressure in the ambient environment. The valve system further includes an outlet valve portion that is biased to a closed position to generally block a flow of outlet fluid therethrough and that is movable to an open position when the pressure in the channel is sufficiently high relative to the pressure in the ambient environment.

17 Claims, 8 Drawing Sheets

Related U.S. Application Data

(60) Provisional application No. 62/580,712, filed on Nov. 2, 2017.

(51) Int. Cl.
| | |
|---|---|
| *B01J 20/18* | (2006.01) |
| *B01J 20/08* | (2006.01) |
| *B01J 20/28* | (2006.01) |
| *B01J 4/00* | (2006.01) |
| *F21S 45/10* | (2018.01) |
| *F21S 45/30* | (2018.01) |
| *F21S 45/33* | (2018.01) |

(52) U.S. Cl.
CPC ..... *B01J 20/2805* (2013.01); *B01J 20/28016* (2013.01); *F21S 45/10* (2018.01); *F21S 45/30* (2018.01); *F21S 45/33* (2018.01); *B01J 2220/66* (2013.01)

(58) Field of Classification Search
CPC ...... B01D 2259/40003; B01D 53/0446; B01D 53/0462; B01D 53/261; B01J 20/08; B01J 20/103; B01J 20/18; B01J 20/28016; B01J 20/2805; B01J 2220/66; B01J 4/008; F21S 45/10; F21S 45/30; F21S 45/33

See application file for complete search history.

(56) References Cited

U.S. PATENT DOCUMENTS

| | | |
|---|---|---|
| 4,755,917 A | 7/1988 | Bals |
| 4,796,163 A | 1/1989 | Dressler |
| 4,809,144 A | 2/1989 | Suzuki |
| 5,665,143 A | 9/1997 | Jarvis et al. |
| 5,775,794 A | 7/1998 | Schmitt |
| 5,930,910 A | 8/1999 | Trapp |
| 5,980,074 A | 11/1999 | Hwang |
| 6,210,014 B1 | 4/2001 | Kubizne et al. |
| 6,422,729 B1 | 7/2002 | Rohrbach et al. |
| 6,709,493 B2 | 3/2004 | DeGuiseppi et al. |
| 6,883,948 B2 | 4/2005 | VanDuyn et al. |
| 7,217,314 B2 | 5/2007 | DeGuiseppi et al. |
| 8,069,875 B2 | 12/2011 | Mashiko |
| 9,109,418 B1 | 8/2015 | Norris |
| 10,627,073 B2 | 4/2020 | Helwig |
| 2003/0133310 A1 | 7/2003 | VanDuyn |
| 2006/0150817 A1 | 7/2006 | DeGuiseppi |
| 2014/0338883 A1 | 11/2014 | Watanabe |
| 2016/0101387 A1 | 4/2016 | Pedace |

FOREIGN PATENT DOCUMENTS

| | | |
|---|---|---|
| CN | 206130788 U | 4/2017 |
| CN | 107185353 A | 9/2017 |
| DE | 2 222 449 | 11/1973 |
| DE | 2 303 473 | 8/1974 |
| DE | 43 04 789 | 8/1994 |
| DE | 10 2006 028295 | 12/2007 |
| DE | 102005019651 B4 | 4/2011 |
| GB | 2051604 A | 1/1981 |
| JP | S55-180202 | 6/1954 |
| JP | 2008/159310 | 7/2008 |
| JP | 2008/527654 | 7/2008 |
| WO | 2018/178532 A1 | 10/2018 |

OTHER PUBLICATIONS

PCT, International Search Report and Written Opinion dated Jan. 16, 2019 which pertains to PCT Application No. PCT/US2018/056822. 13 pages.

European Patent Office, Extended European Search Report dated Jul. 14, 2021 which pertains to EP Patent Application No. 18872447.0. 9 pages.

China National I.P. Administration, Chinese First Office Action dated Sep. 15, 2021 which pertains to Chinese Patent Application No. 201880070963.5. 31 pages.

Intellectual Property India, Examination Report dated Dec. 8, 2021 which pertains to Indian Patent Application No. 202017016160. 6 pages.

China National I.P. Administration, Chinese Second Office Action dated Feb. 8, 2022 which pertains to Chinese Patent Application No. 201880070963.5. 28 pages.

China National I.P. Administration, Chinese Rejection Decision dated May 7, 2022 which pertains to Chinese Patent Application No. 201880070963.5. 17 pages.

Brazilian Industrial Property Office, Office Action and Search Report dated May 31, 2022 which pertains to Brazilian Patent Application No. BR112020007612-0. 5 pages.

Japanese Notification of Reasons for Refusal dated Oct. 31, 2022 which pertains to Japanese Patent Application No. JP2020-524040. 10 pages.

Japanese Patent Office, Japanese Notification of Reasons for Refusal dated Apr. 26, 2023 which pertains to Japanese Patent Application No. 2020-524040. 5 pages.

Japanese Patent Office, Japanese Notification of Reasons for Refusal dated Aug. 31, 2023 which pertains to Japanese Patent Application No. 2020-524040. 3 pages.

\* cited by examiner

ADSORBENT SYSTEM

This application is a continuation of U.S. patent application Ser. No. 16/103,431 filed on Aug. 14, 2018 and entitled ADSORBENT SYSTEM, which in turn claims priority to U.S. Provisional Patent Application Ser. No. 62/580,712, filed on Nov. 2, 2017 and entitled ADSORBENT SYSTEM. The entire contents of both of these documents is hereby incorporated by reference.

This application is directed to an adsorbent system, and more particularly, to an adsorbent system with a particular desiccant and/or a particular valve arrangement to control the flow of fluid through the system.

BACKGROUND

It is often desired to control the levels of moisture/humidity in enclosed spaces. For example, automobile or vehicle headlight or headlamp assemblies are typically generally sealed or enclosed. An excess buildup of moisture can compromise the appearance and/or functionality of the headlight.

SUMMARY

In one embodiment the present invention is an adsorbent system that can help to control the levels of humidity. More particularly, in one embodiment the invention is an adsorbent system including an enclosure having a cavity defining a humidity-controlled environment and a body having or defining a channel therein. The body is coupled to the enclosure such that a first end of the channel is in selective fluid communication with an ambient environment and a second end of the channel is in fluid communication with the humidity-controlled environment. The system further includes an adsorbent material in the channel, wherein the channel and adsorbent material are configured such that inlet fluid flowing from the first end to the second end through the channel is flowable over at least a portion of the adsorbent material, and such that outlet fluid flowing from the second end to the first end is directly flowable over a majority of the portion of the adsorbent material that is flowable over by the inlet fluid, The system further includes a valve system positioned at or adjacent to or in fluid communication with the first end of the channel. The valve system includes an inlet valve portion that is biased to a closed position to generally block a flow of inlet fluid therethrough and that is movable to an open position when a pressure in the channel is sufficiently low relative to a pressure in the ambient environment. The valve system further includes an outlet valve portion that is biased to a closed position to generally block a flow of outlet fluid therethrough and that is movable to an open position when the pressure in the channel is sufficiently high relative to the pressure in the ambient environment.

DETAILED DESCRIPTION

Figure 1:
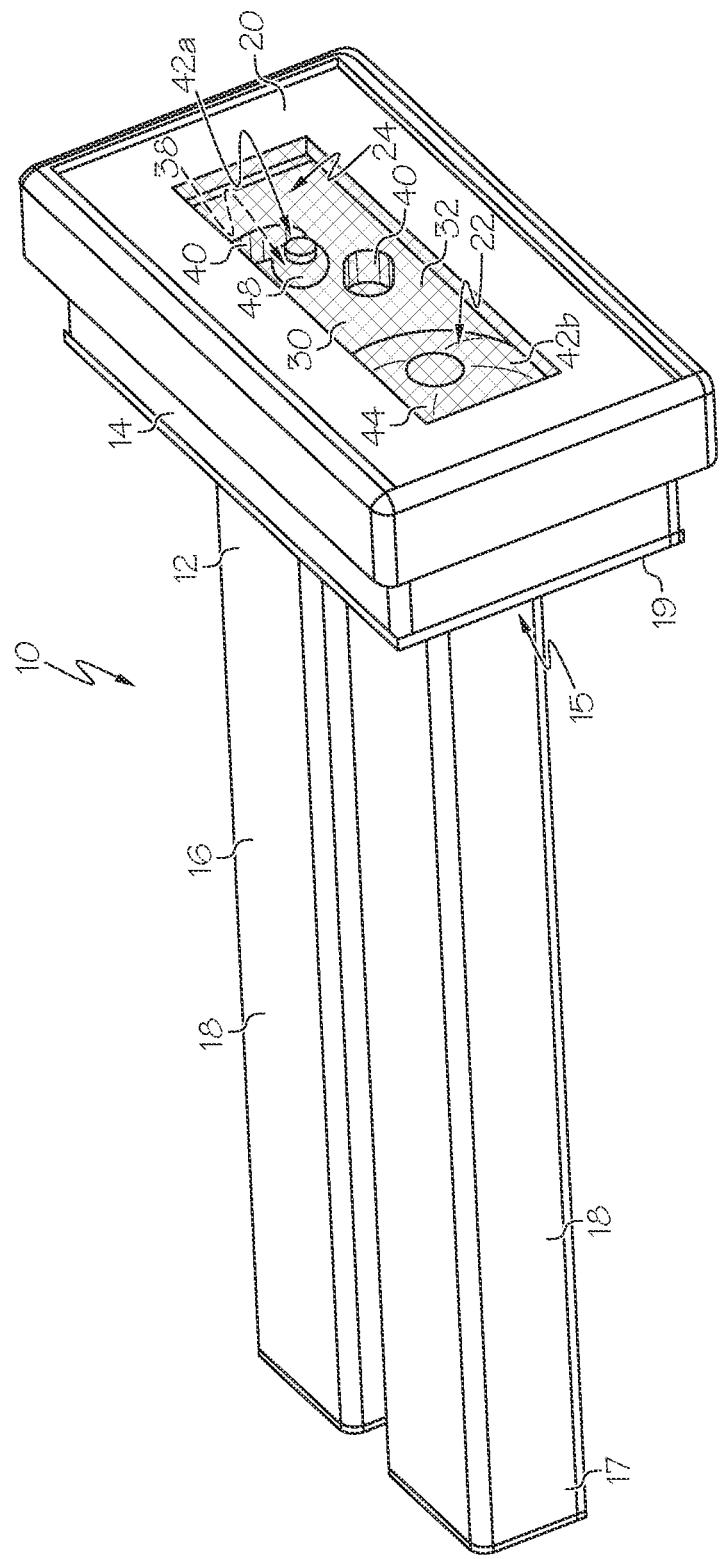
FIG. 1 is a front perspective view of one embodiment of the adsorbent system of the present invention.
Figure 2:
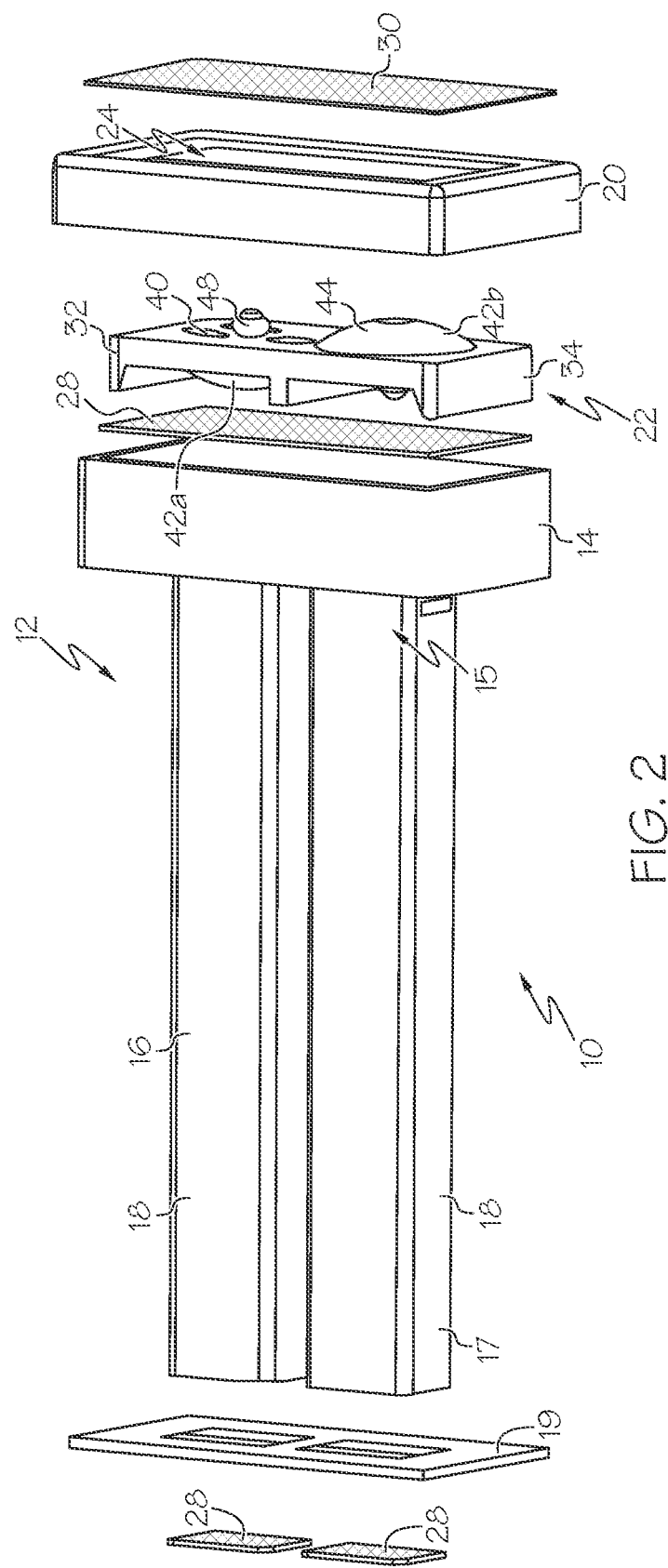
FIG. 2 is an exploded view of the system of FIG. 1.
Figure 3:
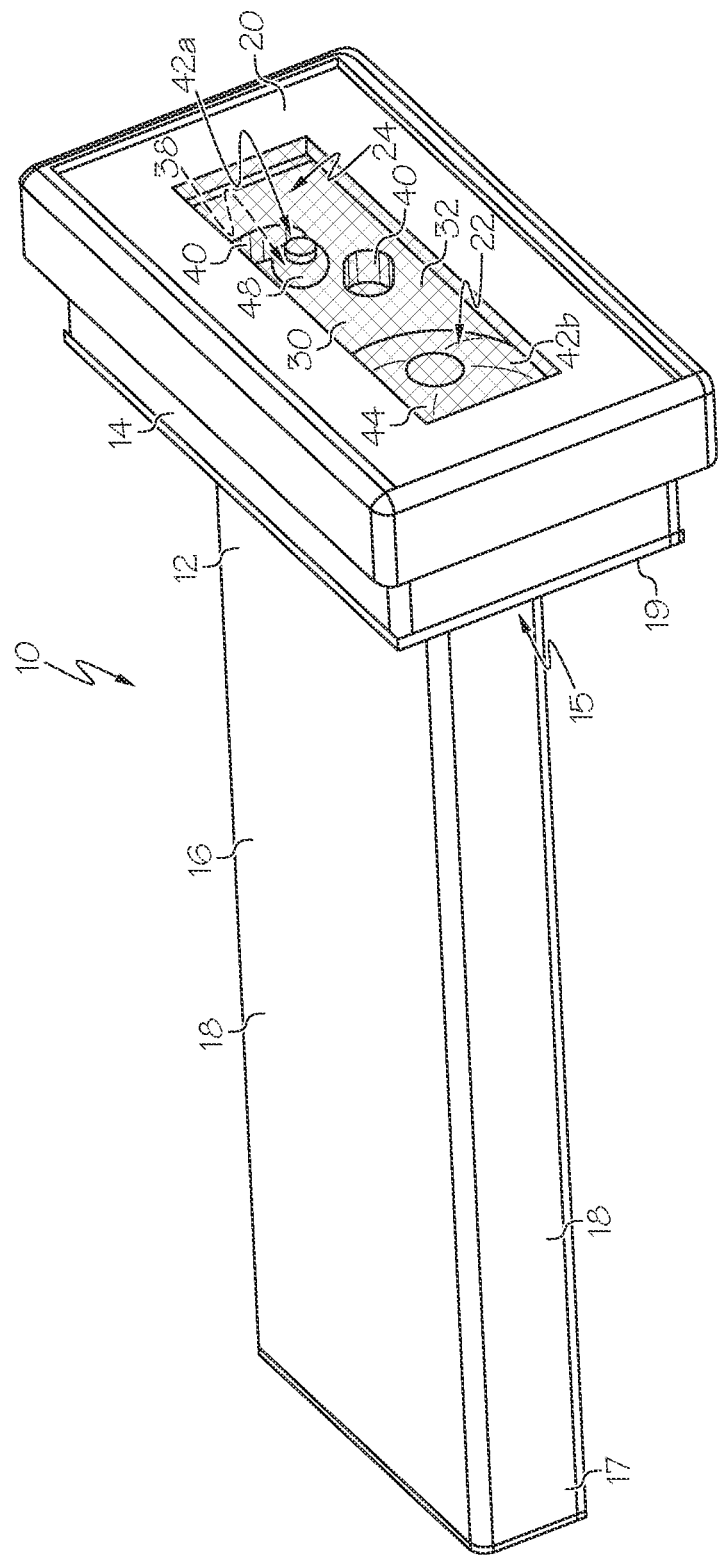
FIG. 3 is a front perspective view of another embodiment of the adsorbent system of the present invention.
Figure 4:
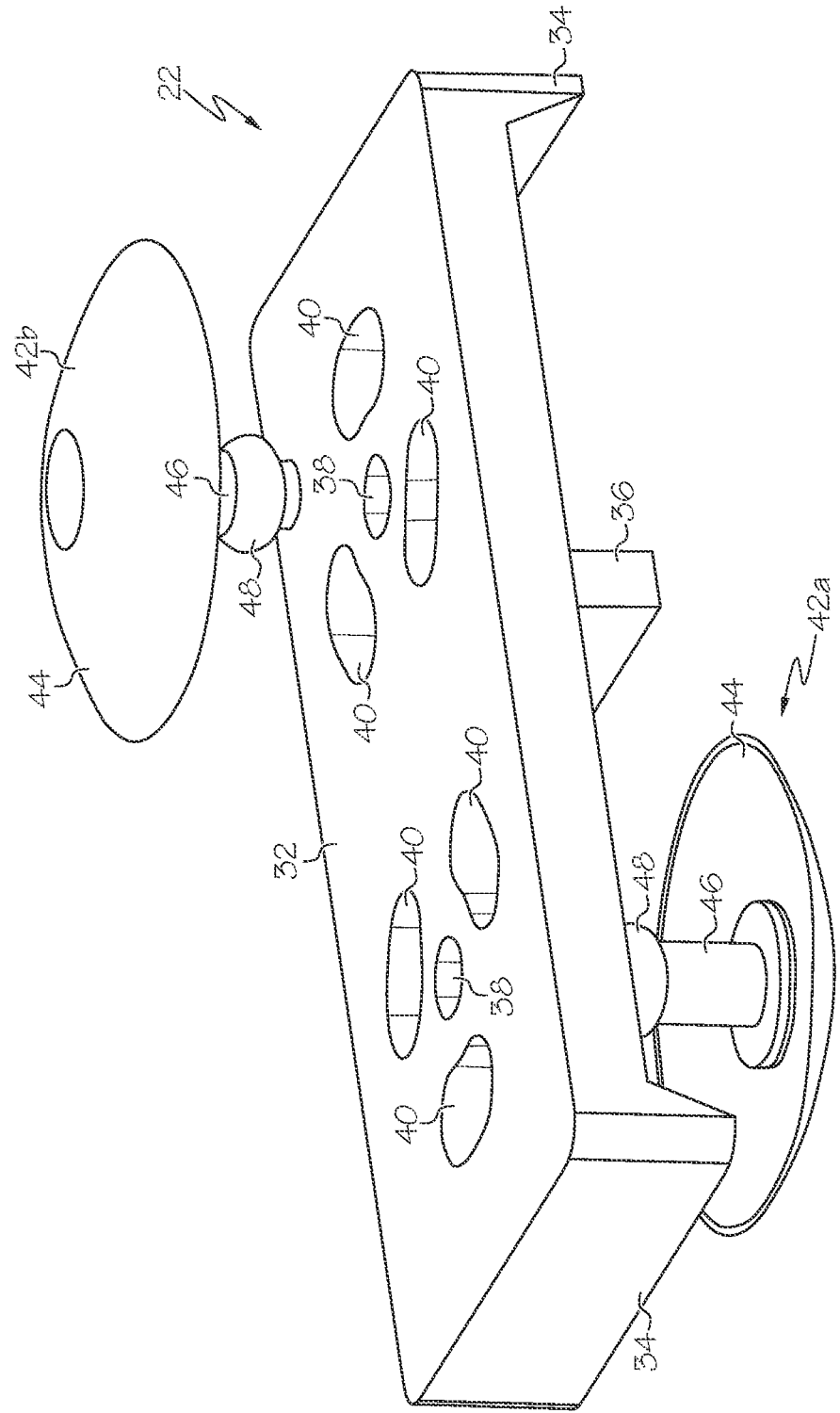
FIG. 4 is a detail, exploded perspective view of the valve system of FIG. 2.
Figure 5:
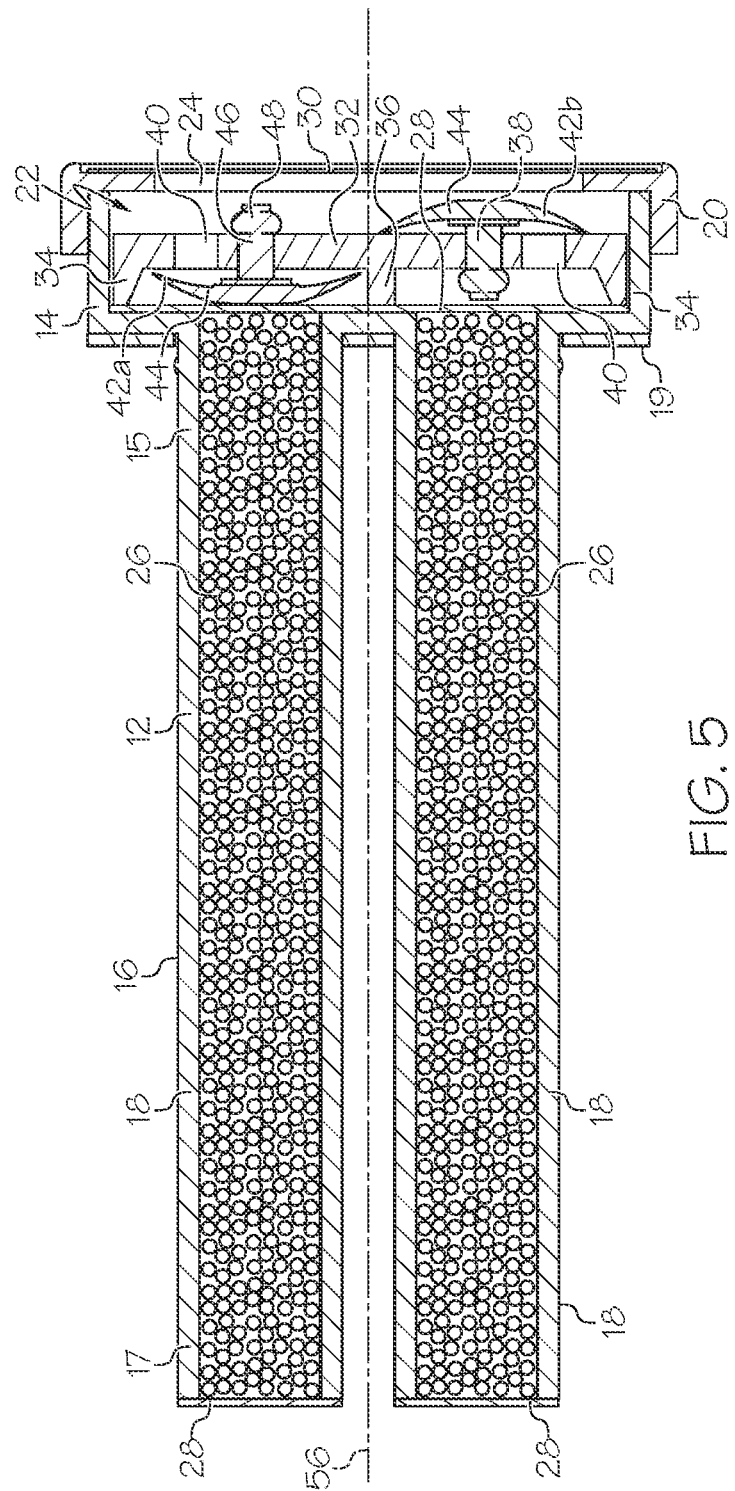
FIG. 5 is a side cross section of the system of FIG. 1.
Figure 6:
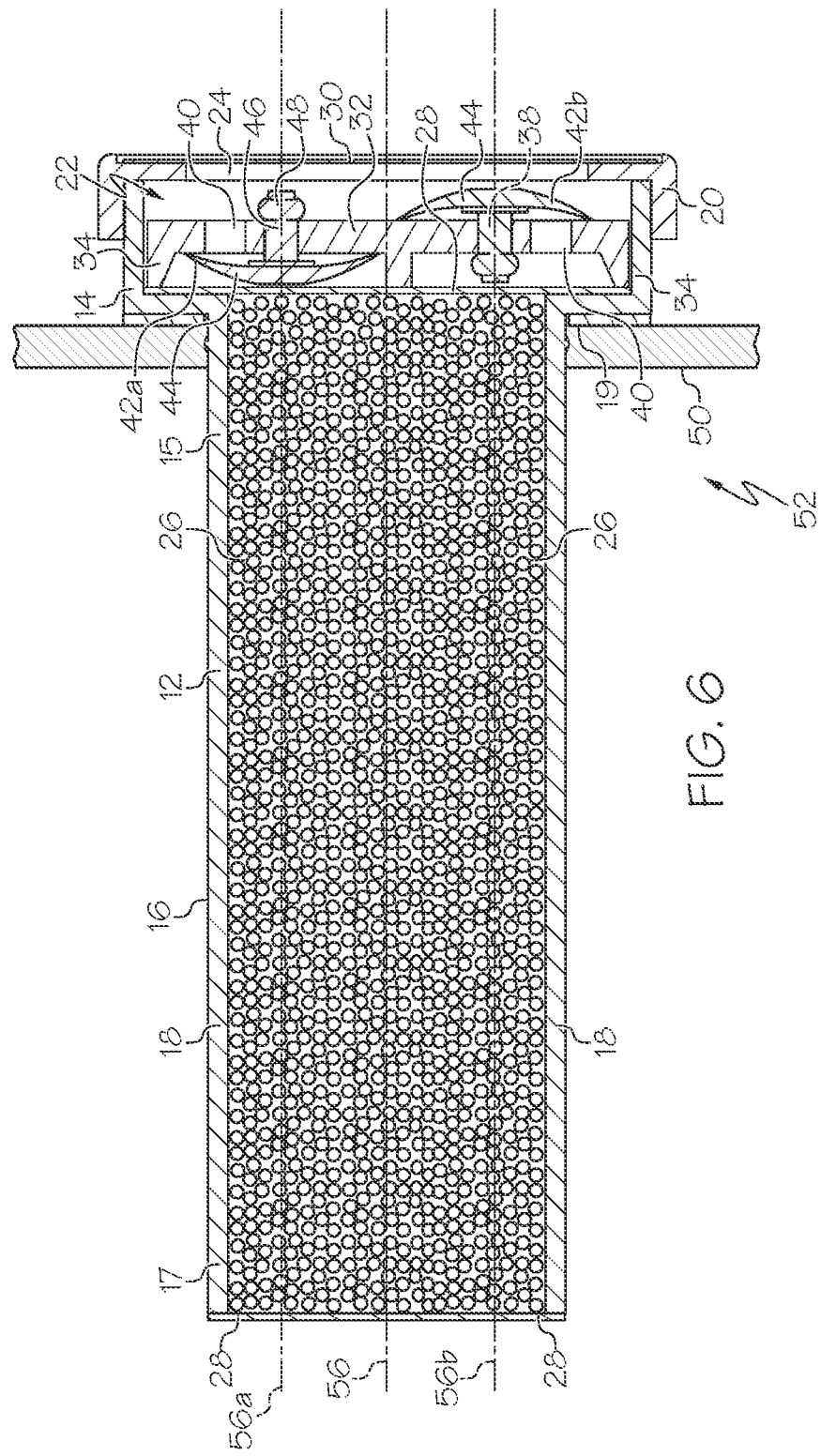
FIG. 6 is a side cross section of the system of FIG. 3, and shown in conjunction with part of a headlight assembly.

With reference to FIGS. 1-6, in one embodiment the adsorbent system of the present invention, generally designated 10, includes a body 12 including an end enclosure 14 and a channel assembly 16 having a pair of channels 18 (in the embodiment of FIGS. 1, 2 and 5) and a single channel 18 (in the embodiment of FIGS. 3 and 6). The channels 18 and channel assembly 16 have a first end 15 positioned at, adjacent to, or coupled to the end enclosure 14, and a second, distal end 17 located at an opposite end thereof. The end enclosure 14 and each channel 18 are generally rectangular in cross-section in the illustrated embodiment, although those components can take on various other shapes as desired.

The system 10 can include a valve system 22 positioned in the enclosure 14, and can optionally include a cover 20 having a central opening 24 coupled to the enclosure 14 to retain the valve system 22 in place and/or protect the valve system 22. An adsorbent material 26 can be positioned in and fill each channel 18, and can take the form of particulates or beads as shown in FIGS. 5 and 6, but can also be solids blocks or other forms.

Retaining sheets of material 28 (FIG. 2) can be positioned at the first 15 and second 17 ends of the channels 18 to trap the adsorbent material 26 in the channels 18. The sheets 28 can be generally air and/or fluid permeable and in one case can take the form of a fine mesh, microporous nonwoven sheet or other similar material with a pore size smaller than a size of the particulates of the adsorbent material 26. A protective sheet 30, which is moisture vapor (e.g., water vapor) permeable but liquid (e.g., liquid water) impermeable can be optionally positioned in the opening 24 of the cover 20 to prevent bulk liquid from entering the system 10. Various gaskets, seals and the like (including gasket 19, as will be described in greater detail below) can also be positioned at joints and locations where the various components are joined together or to external components.

With reference to FIG. 4, the valve system 22 can include a valve plate 32 having a pair of outer legs 34 and an outwardly-extending center stand 36. The valve plate 32 can have a pair of valve-receiving openings 38 and a plurality of fluid transmission openings 40 spaced about each valve-receiving opening 38. The valve system 22 can include a pair of valve components 42, such as umbrella valve components 42, positioned on opposite sides of the valve plate 32. Each umbrella valve component 42 can have a sealing shroud 44 and a stem 46 with a bulbous portion 48 at a distal end thereof. Each stem 46 can be passed through an associated valve-receiving opening 38 of the valve plate 32 to secure the umbrella valve components 42 in place, as best shown in FIGS. 5 and 6, where the sealing shrouds 44 sealingly engage the valve plate 32 about a perimeter of the shrouds 44. Valve 42a can take the form of an inlet valve or inlet valve portion and valve 42b can take the form of an outlet valve or outlet valve portion for purposes of which will be described in greater detail below.

When the system 10 is assembled, the opening 24 of the cover 20, the central cavity of the enclosure 14 and the channel assembly 16 are all in fluid communication with each other through the valve system 22. Moreover, in the embodiment of FIGS. 1, 2 and 5, each of the channels 18 can be in fluid communication with each other in or via the enclosure 14 (e.g. below the valve plate 32). In particular, with reference to FIG. 5, the center stand 36 of the valve plate 32 can be shorter than the legs 34 and slightly spaced away from the channel assembly 16 to define a gap therebetween (e.g. where the sheet of material 28 is located) to allow fluid communication between the channels 18. In this manner, fluid can flow through the opening 24 of the cover 20, through the inlet valve 42a (when open), enter the first end 15 of both channels 18, and exit through the second, distal end of both channels 18. In the illustrated embodiment, the inlet 42a and outlet valves 42b are positioned adjacent to each other and are in direct fluid communication with each other (e.g. in one case below the center stand 36 as described above), and there is no adsorbent material positioned directly between the shortest path of fluid communication between inlet 42a and outlet 42b valves in the system 10. In other words, the embodiment of FIGS. 1, 2 and 5, with two channels 18, can be considered to be functionally equivalent to the embodiment of FIGS. 3 and 6 with a single channel 18. Alternatively a system with more than two channels 18 can be utilized.

Both the inlet 42a and outlet 42b valves can be naturally biased by their shape and/or configuration (or biased by some other force or component, such as a spring or the like) to their closed positions where the fluid transmission openings 40 are generally closed/covered/sealed by the sealing shrouds 44. When there is sufficient pressure differential across the inlet valve 42a (e.g. when the pressure in the channel assembly 16 is sufficiently lower than the pressure in the ambient environment or in the enclosure 14 on the opposite side of the valve plate 32) the outer peripheral portions of the sealing shroud 44 of the inlet valve 42a move away from the valve plate 32, moving the inlet valve 42a to an open position and allowing fluid to flow through the associated fluid transmission openings 40. Valve 42a of FIG. 5 is shown in an open position for illustrative purposes.

Once the pressure differential is sufficiently relieved, the inlet valve 42a will automatically return to its closed position, shown in FIG. 6. Similarly, the outlet valve 42b will open when there is a sufficient pressure differential thereacross (e.g. when pressure of fluid inside the channel assembly 16 is sufficiently greater than fluid on the opposite side of the valve plate 32, or than fluid in the ambient environment). Once the pressure difference is sufficiently relieved, the outlet valve 42b will automatically return to its closed position. In one case, each of the valves 42a, 42b have an open or cracking pressure of between about 0.1 mbar and about 50 mbar in one case, or between about 1 mbar and about 5 mbar in another case, although the cracking pressure of the valves 42a, 42b can of course be varied as desired to suit the desired application/end use.

Although the valves 42a, 42b are disclosed as taking the form of umbrella valves, it should be understood that nearly any other wide variety of valves or valve arrangements, such as check valves, diaphragm valves or other one-way valves can be utilized. Moreover, while the valve system 22 is illustrated as taking the form of two one-way valves 42a, 42b that prevent/block flow in opposite directions, in one embodiment a two-way valve, which can selectively permit/block fluid flow as desired, can be utilized.

Figure 7:
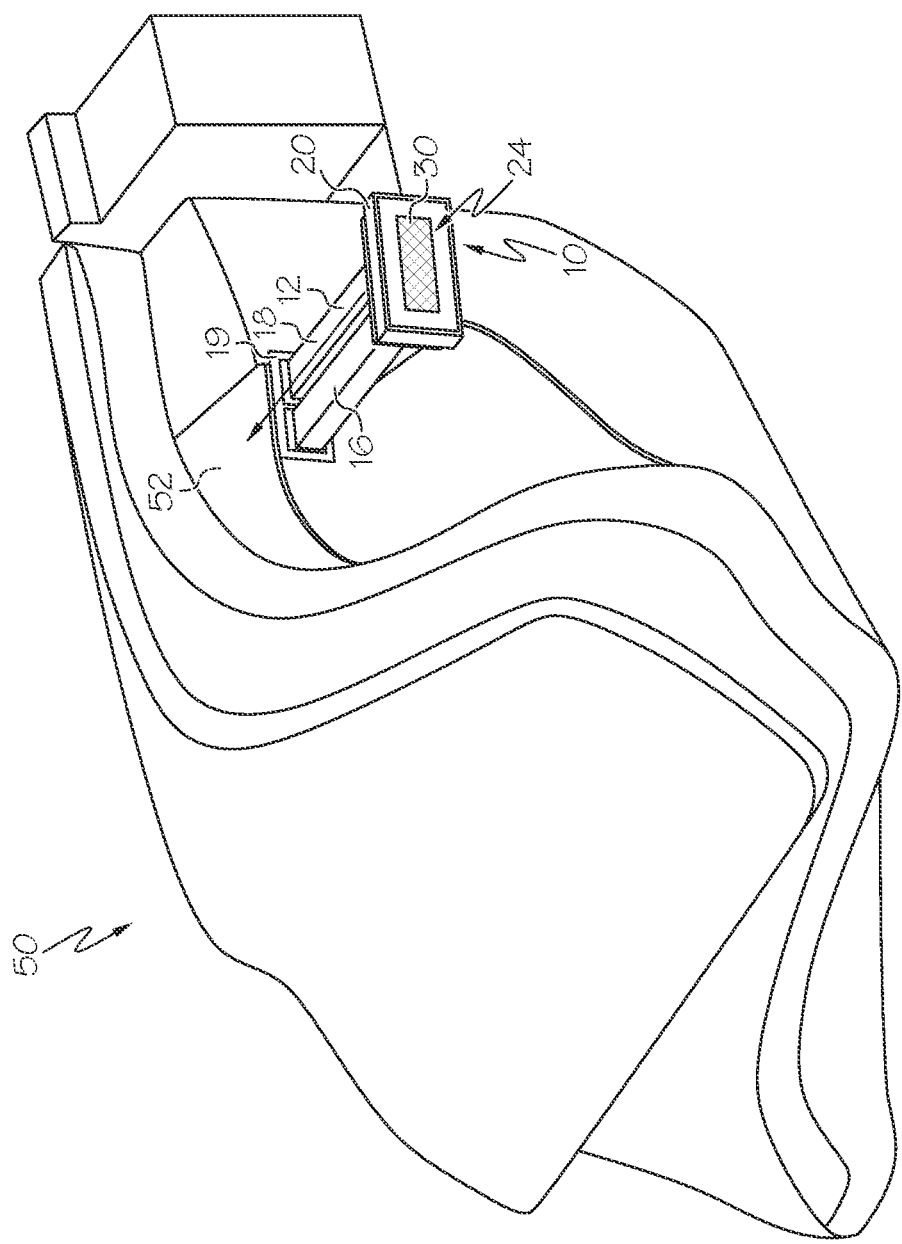
FIG. 7 is a perspective view of the adsorbent system of FIG. 1 positioned adjacent to a vehicle headlight assembly.
Figure 8:
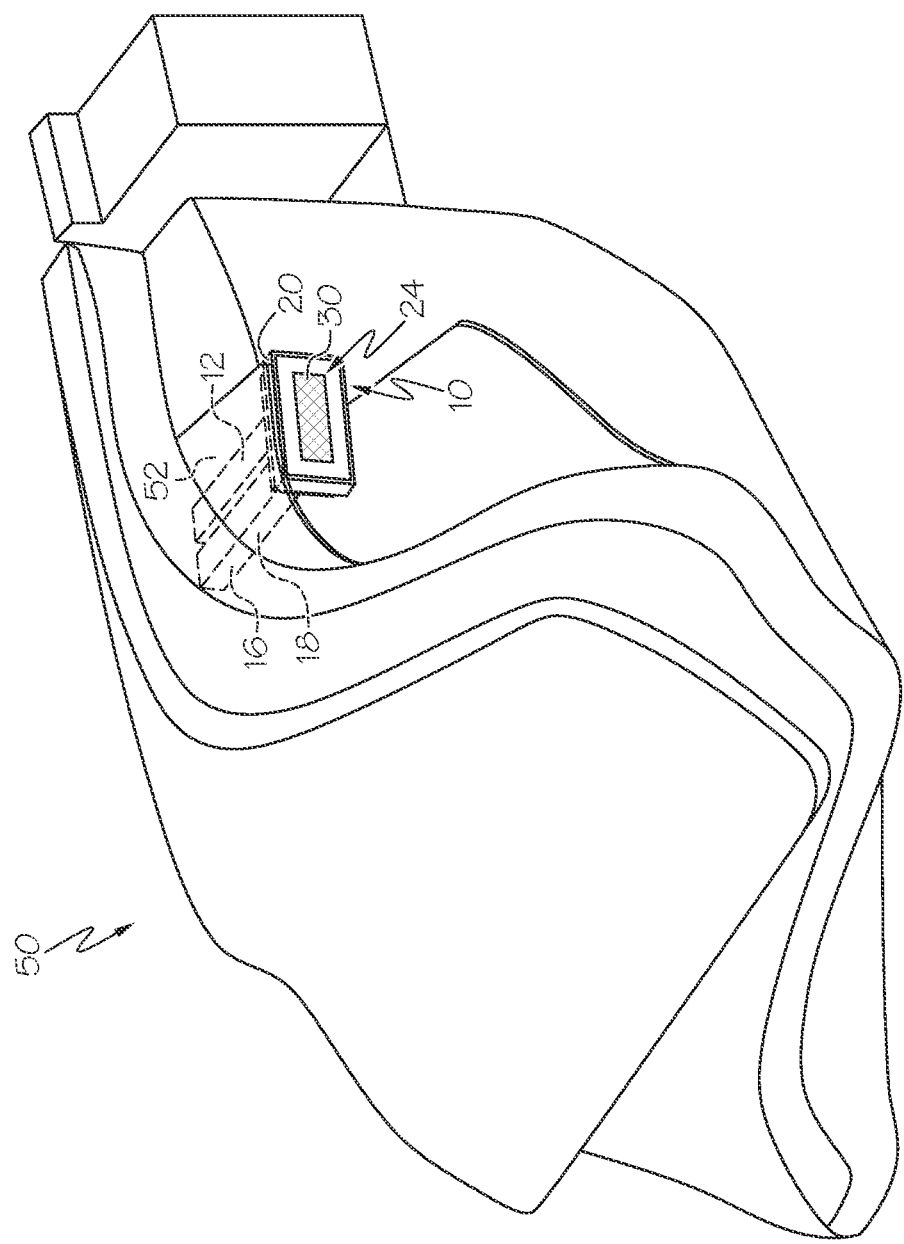
FIG. 8 shows the adsorbent system of FIG. 7 inserted into the vehicle headlight assembly of FIG. 7.

As shown in FIGS. 7 and 8, the adsorbent system 10/channels 18 can be coupled to an automobile or vehicle headlight/headlamp assembly, generally designed 50, by any of a wide variety of means or structure, such as welding, adhesives, interference fit, releasable attachments (such as interlocking latches etc.). The headlight assembly 50 can include an inner cavity 52 or other environment in which it is desired to control the moisture/humidity. In one case the channels 18 partially or fully extend into the headlamp assembly and are positioned in the inner cavity 52, as shown in FIG. 8, where FIG. 7 is an exploded view showing the system 10 prior to insertion into the headlamp assembly 50. When the channels 18 are fully inserted into the inner cavity 52, the end enclosure 14 engages an outer wall of the headlight assembly 50 with the gasket 19 positioned therebetween to aid in forming a seal, as shown in FIG. 6. The adsorbent material 26 can be in fluid communication with the inner cavity 52 to thereby help to control the levels of moisture/humidity in the inner cavity 52 or other humidity-controlled environment.

In many cases, the headlight assembly 50 includes a vent such that the cavity 52 is not entirely closed/sealed. In this case, the system 10/channels 18/gasket 19 can be fluidly and/or sealingly coupled to the vent(s) to help provide the desired humidity control. If desired the system 10 can be effectively secured to the only vent(s) of the headlight assembly 50 such that all air or other fluid entering or exiting the headlight assembly 50 is passed through/processed by the system 10, and the adsorbent system 10 acts as a vent, or the only vent for the headlight assembly.

The system 10 can be designed to be coupled to, and used in conjunction with, a headlight assembly 50 as an aftermarket or retrofit item; that is, after the headlight assembly 50 has been already manufactured and/or shipped and/or installed. In other cases, however, the system 10 can be integrated into the headlight assembly 50 at the time of manufacture. In either embodiment, the channel assembly 16, channels 18 and/or adsorbent material 26 can be fully or partially positioned inside the cavity 52 to provide space saving and reduce potential damage to those components. This configuration may require specific arrangements/designs so that the channel assembly 16 fits into available space in the cavity 52.

It should also be understood that, while the assembly 10 is shown coupled to and used in conjunction with a vehicle headlight assembly 50, the system 10 can be coupled to and used in conjunction with nearly any environment where it is desired to control humidity/moisture levels. For example, in one case the system 10 can be used in conjunction with an electrical cabinet or electronics enclosure where moisture control helps to prevent corrosion and/or shorting of the electronic devices, and periodic operation of the electronics or other devices may generate sufficient heat to cause air cycling and regeneration of the adsorbent material 26. Alternatively, if desired a heat source can be provided, and coupled to and/or positioned in the body 12 or cavity 52 and or in fluid or thermal communication with the body 12 and/or adsorbent material 26 and/or channels 18, to provide an active system 10 which provides for regular regeneration of the adsorbent material, as will be described in greater detail below.

Once the adsorbent system 10 is fluidly coupled to the cavity 52 of the headlight assembly 50, or to some other humidity-controlled environment, the system 10 can control levels of humidity and remove undesired moisture from the air/fluid in the cavity 52/humidity-controlled environment. In particular, the adsorbent material 26 can adsorb excess moisture from the air/fluid positioned in, or in fluid communication with, the cavity 52.

In many cases the temperature and/or pressure inside the cavity 52 will periodically vary. For example, when the headlight 50 is operated, the heat generated by the filament bulb, electric arc, LEDs, lasers or the like will cause the temperature, and therefore pressure, inside the cavity 52 to raise, in which case the filament bulb, electric arc, LED, lasers or the like serve as a heat source. The increased pressure is, in turn, transmitted through the channels 18 to the valve plate 32/valve assembly 22. Sufficiently high pressure, relative to the ambient environment, will cause the outlet valve 42b to open and exhaust air/fluid to provide sufficient pressure balance. Conversely, when the pressure in the cavity 52, channel assembly 16 and/or end enclosure 14 becomes too low relative to the ambient atmosphere (e.g. when the headlight 50 cools down, or is not operated and/or due to other conditions) the inlet valve 42a will open and allow ambient air/fluid to enter the channels 18 until sufficient pressure balance is achieved.

In this manner, the valve system 22 helps to maintain pressure balance thereacross, but limits the amount of fluid exiting and/or entering the system 10 to thereby minimize or reduce the amount of incoming fluid which needs to be treated by the adsorbent material 26. This helps to extend the life of the system 10 and ensures the adsorbent material 26 can sufficiently adsorb moisture. In addition, periodic use of the headlight assembly 50 or another heat source provides a natural heating and cooling cycle, which in turn causes thermal expansion and contraction of the air/fluid in the system 10 allowing moisture to be regularly vented. In addition, periodic operation of the headlight assembly 50 enables the adsorbent material 26 to be at least partially regenerated due to the heat of the headlamp.

Ambient, or inlet, air/fluid passing through the inlet valve 42a is required to pass through the channel(s) 18, and thereby the adsorbent material 26 positioned therein, prior to reaching the cavity 52. In particular, in one case the system 10 can include a fluid path 56 (FIGS. 5 and 6) extending in a straight line or generally straight line between the first end 15 and the second end 17 of the channel 18, and the inlet fluid flows along the fluid path 56 and flows or is flowable or is configured to flow about the adsorbent material 26 positioned in the channels 18. Conversely, outlet fluid, flowing from the second end 17 to the first end 15 of the channels 18 will also follow a path along entirely, or generally the entirety of, the fluid path 56. In other words, the outlet fluid is also required flow about (or be flowable about) all of the adsorbent material 26 and/or all or substantially all the adsorbent material 26 flowed over by the inlet fluid.

An inlet portion of the fluid path 56 (also termed the inlet fluid path 56a) can in one case be considered the shortest path between an inlet to the channel 18 (e.g. through inlet valve 42a) and an exit of the channel 18 (e.g. at open end 17), and an outlet portion of the fluid path 56 (also termed the outlet fluid path 56b) can in one case be considered the shortest path between an inlet to the channel 18 (e.g. at open end 17) and an exit to the channel (e.g. through outlet valve 42b). In one case the inlet fluid path 56a and/or outlet fluid paths 56b are both straight lines that are parallel to each other or generally parallel (+/−up to 5 degrees in one case, or 10 degrees in another case). The inlet fluid path 56a and/or outlet fluid path 56b can both be parallel or generally parallel to the direction of fluid entering and/or exiting the channel 18.

The system 10 can be designed to force all inlet fluid to flow over the adsorbent material 26 to dry the incoming inlet fluid prior to entering the cavity 52, and to force all outflow fluid, which is typically at a relatively higher temperature, to flow over or through the same adsorbent material 26 to at least partially regenerate the adsorbent material 26 and carry some moisture out of the cavity 52. In one case, the outlet fluids flows over, or is flowable over, a majority (e.g. at least 50% in one case) of the adsorbent material 26 that is flowed over or is flowable over by the inlet fluid. In another embodiment, the outlet fluid flows over, or is flowable over, at least about 80% of the adsorbent material 26 that is flowed over by, or is flowable over by the inlet fluid. When two or more channels 18 are used the flow of fluid over the adsorbent material 26 can refer to flow in all channels 18; since the channels 18 are fluidly connected they can be considered a single channel for functional purposes.

The adsorbent material 26 can take any of a wide variety of forms. In one case, however, the adsorbent material 26 is type B silica gel (also known as medium pore silica gel) in particulate form but can take the form of other silica gel types (including types A and C), zeolites, alumina and other desiccants. In one case, however, type B silica gel may be advantageous since the temperatures to which the adsorbent material 26 are exposed during operation of the headlight assembly 50 may be relatively low, due to distance from the headlight assembly 50 and/or relatively low headlight temperatures (e.g. due to increasing use of LED lamps as opposed to filament lamps or the like). In one case, for example, it may be expected that the adsorbent material 26 is exposed to a maximum temperatures of less than about 130° F. in one case, or less than about 120° F. in another embodiment.

In one case, the adsorbent material 26 is type B silica gel with an average pore diameter of between about 4.5 nm and about 7 nm. The relatively large pore size and greater total pore volume of type B silica gel (at least as compared to type A silica gel) enables type B silica gel to adsorb less moisture at a lower relative humidity while having a higher maximum moisture adsorption capacity when near the dew point (at least as compared to type A silica gel). The tendency of type B silica gel to adsorb less moisture at moderate relative humidity (e.g. about 30% to about 60% relative humidity in one case) allows for more effective regeneration of the type B silica gel when the surrounding temperature is increased or relative humidity is decreased by a moderate amount. Type B silica gel can have an adsorption capacity of ~10% w/w at 50% relative humidity and at a temperature of 25° C.; and ~70% w/w at 90-99% relative humidity at 25° C. When the temperature of the surrounding fluid increases, the relative humidity decreases (for identical absolute water loading in air), and water will leave the type B silica gel, thereby at least partially regenerating the gel. This fluctuation of adsorption/regeneration is leveraged favorably in the current system, and the properties of the type B silica provide benefits in the expected temperature zones of operation for headlight/headlamp assemblies.

It should be noted that the adsorbent material 26 described herein provides particular advantages and can be used in nearly any desiccant system, including those for use with headlamp assemblies. The desiccant system in that case can include the channel assembly 16, valve system 22 etc. as described above, but in other cases may not. For example in some cases the adsorbent material 26 may not be used in conjunction with the channel assembly 16 and/or valve system 22, etc. In addition, as outlined above the system 10 can be used in various assemblies and conditions other than headlamp assemblies Having described the invention in detail and by reference to the various embodiments, it should be understood that modifications and variations thereof are possible without departing from the scope of the claims of the present application.

What is claimed is:

1. An adsorbent system comprising:
   an enclosure having a cavity defining a humidity-controlled environment;
   a body having or defining a channel therein, wherein said body is coupled to said enclosure such that a first end of the channel is in selective fluid communication with an ambient environment and a second end of said channel is in fluid communication with said humidity-controlled environment;
   an adsorbent material in said channel, wherein said channel and adsorbent material are configured such that inlet fluid flowing from the first end to the second end through said channel is flowable over at least a portion of said adsorbent material, and such that outlet fluid flowing from the second end to the first end is directly flowable over a majority of said portion of said adsorbent material that is flowable over by said inlet fluid; and
   a valve system positioned at or adjacent to or in fluid communication with the first end of the channel, wherein the valve system includes an inlet valve portion that is biased to a closed position to generally block a flow of inlet fluid therethrough and that is movable to an open position when a pressure in said channel is sufficiently low relative to a pressure in said ambient environment, and wherein the valve system further includes an outlet valve portion that is biased to a closed position to generally block a flow of outlet fluid therethrough and that is movable to an open position when the pressure in said channel is sufficiently high relative to the pressure in said ambient environment.

2. The system of claim 1 wherein the valve system is positioned such that inlet fluid entering the body from the ambient environment passes through said valve system before flowing over said adsorbent material, and such that outlet fluid exiting the body to the ambient environment passes through the valve system before entering the ambient environment.

3. The system of claim 1 wherein the channel and adsorbent material are configured such that said outlet fluid is flowable over at least about eighty percent of the adsorbent material that is flowable over by said inlet fluid.

4. The system of claim 1 wherein the system includes a fluid path extending in a straight line between said first end of said channel and said second end of said channel, and wherein said channel and adsorbent material are configured such that said outlet fluid and said inlet fluid are both flowable along generally an entirety of said fluid path.

5. The system of claim 1 wherein the inlet fluid is flowable along an inlet fluid path which is the shortest path between the first end and the second end, and wherein the outlet fluid is flowable along an outlet fluid path which is the shortest path between the second end and the first end, and wherein the inlet fluid path and the outlet fluid path are generally parallel.

6. The system of claim 1 wherein the inlet valve portion and the outlet valve portion are both passive valves that are automatically openable when a sufficient pressure differential exists thereacross.

7. The system of claim 1 wherein the inlet valve portion is axially offset from the outlet valve portion, wherein the axial direction is defined with respect to a direction of a flow of fluid through the inlet valve.

8. The system of claim 1 wherein the adsorbent material is a particulate desiccant.

9. The system of claim 1 wherein the adsorbent material has an average pore size greater than type A silica gel.

10. The system of claim 1 wherein the adsorbent material is at least one of silica gel, zeolites or alumina.

11. The system of claim 1 wherein the adsorbent material is at least one of type B silica gel or type C silica gel.

12. The system of claim 1 wherein the adsorbent material is type B silica gel.

13. The system of claim 1 wherein the enclosure is configured to be periodically exposed to sufficient heat to cause regeneration of the adsorbent material.

14. The system of claim 1 further comprising at least one device positioned in the enclosure and configured such that periodic operation of the device generates sufficient heat to cause regeneration of the adsorbent material.

15. The system of claim 1 wherein the cavity is generally sealed relative to the ambient environment except for fluid communication provided via the body.

16. The system of claim 15 wherein the enclosure is at least one of a vehicle headlamp assembly, an electrical cabinet or an electronics enclosure.

17. An adsorbent system comprising:
   an enclosure having a cavity defining a humidity-controlled environment;
   a body having or defining a channel therein, wherein said body is coupled to said enclosure such that a first end of the channel is in selective fluid communication with an ambient environment and such that a second end of said channel is in fluid communication with said humidity-controlled environment;
   an adsorbent material in said channel, wherein said channel and adsorbent material are configured such that inlet fluid flowing from the first end to the second end is flowable over at least a portion of said adsorbent material along an inlet fluid path which is the shortest path flowable through said channel by said inlet fluid, and wherein said channel and adsorbent material are configured such that outlet fluid flowing from the second end to the first end is directly flowable over the portion of said adsorbent material flowable over by the inlet fluid along an outlet fluid path; and
   a valve system positioned at or adjacent to or in fluid communication with the first end of the channel, wherein the valve system includes an inlet valve portion that is biased to a closed position to generally block a flow of inlet fluid therethrough and that is movable to an open position when a pressure in said channel is sufficiently low relative to a pressure in said ambient environment, and wherein the valve system further includes an outlet valve portion that is biased to a closed position to generally block a flow of outlet fluid therethrough and that is movable to an open position when the pressure in said channel is sufficiently high relative to the pressure in said ambient environment.

* * * * *